US012492569B2

(12) United States Patent
Cutts et al.

(10) Patent No.: US 12,492,569 B2
(45) Date of Patent: Dec. 9, 2025

(54) SEISMIC ANCHOR SYSTEM, APPARATUS, AND STRUCTURE INCLUDING SAME

(71) Applicants: William Cutts, Houston, TX (US); Praveen Malhotra, Sharon, MA (US)

(72) Inventors: William Thomas Cutts, Houston, TX (US); Praveen Malhotra, Sharon, MA (US)

( * ) Notice: Subject to any disclaimer, the term of this patent is extended or adjusted under 35 U.S.C. 154(b) by 286 days.

(21) Appl. No.: 18/383,679

(22) Filed: Oct. 25, 2023

(65) Prior Publication Data

US 2025/0137275 A1 May 1, 2025

(51) Int. Cl.

| | |
|---|---|
| ***E04H 9/02*** | (2006.01) |
| ***E04B 1/24*** | (2006.01) |
| ***E04B 1/98*** | (2006.01) |
| ***F16F 7/12*** | (2006.01) |

(52) U.S. Cl.
CPC ............... *E04H 9/021* (2013.01); *E04B 1/98* (2013.01); *E04H 9/02* (2013.01); *F16F 7/128* (2013.01); *E04B 2001/2442* (2013.01)

(58) Field of Classification Search
CPC ... E04H 9/021; E04H 9/02; E04B 1/98; E04B 2001/2442; F16F 7/128
See application file for complete search history.

(56) References Cited

U.S. PATENT DOCUMENTS

| | | | | |
|---|---|---|---|---|
| 5,163,256 | A * | 11/1992 | Fukumoto | E04H 9/02 52/573.1 |
| 6,085,472 | A | 7/2000 | Malhotra | |
| 9,896,837 | B2 * | 2/2018 | Matteson | E04H 9/0215 |
| 10,370,844 | B2 | 8/2019 | Lomax | |
| 10,851,559 | B2 * | 12/2020 | Almazán Campillay | E02D 5/74 |
| 10,988,952 | B2 * | 4/2021 | Hou | E04H 9/021 |
| 11,761,577 | B2 * | 9/2023 | Masek | F16L 3/02 248/636 |
| 11,879,264 | B2 * | 1/2024 | Montgomery | E04H 9/0215 |
| 2019/0338547 | A1 | 11/2019 | Almazán Campillay | |
| 2025/0137275 | A1 * | 5/2025 | Cutts | E04H 9/021 |

* cited by examiner

*Primary Examiner* — Andrew J Triggs
(74) *Attorney, Agent, or Firm* — Calvert Technology Law, PLLC; Nathan H. Calvert

(57) ABSTRACT

A seismic anchor, system, and structure are disclosed, the seismic anchor including a main member for attachment to a structure to be stabilized, a secondary member, and an anchor. The main member has a first tensile strength. The secondary member is attached to the main member, and has a second tensile strength lower than the first tensile strength. The anchor includes an anchor body attached to the secondary member and a moveable stop member attached to the main member, which is allowed to move relative to the anchor body such that in a first mode, force is applied to the anchor body through the secondary member, and in a second mode in which the secondary member has yielded, force is applied to the anchor body through the main member and the moveable stop member.

18 Claims, 5 Drawing Sheets

SEISMIC ANCHOR SYSTEM, APPARATUS, AND STRUCTURE INCLUDING SAME

TECHNICAL FIELD OF THE INVENTION

The invention relates to seismic anchor systems in the construction field.

BACKGROUND

Above-ground storage tanks often contain hazardous materials such as oil, gas, or chemicals. The structural integrity of these tanks is critical not just for operational efficiency but also for safety, particularly in seismically active regions. In the event of an earthquake, the lateral and vertical forces generated can cause the tank to shift, tip, rupture, or even collapse if it is not adequately anchored. Seismic anchors help resist these forces. A well-anchored tank is also less likely to suffer structural damage like rupturing or buckling during seismic events. A ruptured tank can have devastating consequences, including fire, explosion, or contamination. Seismic activity can also cause the liquid inside the tank to slosh, which can exert additional forces on the tank walls. Such an incident could result in spills or leaks, posing significant environmental risks, financial losses, and potentially leading to loss of life.

Given the critical role that storage tanks play in various industrial processes, as well as the potential risks involved, seismic anchoring is considered a best practice in tank design and construction, particularly in areas prone to earthquakes.

For tanks and other structures, seismic anchors are frequently used to stabilize the structure and mitigate earthquake risks. Such anchors often use a bolt, cable, or strap to secure a portion of the structure to a foundation or an anchor point. Many jurisdictions have building codes that mandate the use of seismic anchors for structures like storage tanks. Engineering standards may also specify a given level of earthquake protection.

However, typical anchor designs for structures such as tanks are made for stabilizing the structure during seismic events of a designated level, often expressed by their expected occurrence interval such as a "500-year quake". Such anchor designs typically do not mitigate the more severe risks of higher level, less frequent, earthquakes such as a "2500-year quake". What is needed are anchor systems that can help to mitigate such risks without greatly increasing the complexity, cost, and installation time of the anchor system.

SUMMARY

A seismic anchor, system, and structure are disclosed, the seismic anchor including a main member for attachment to a structure to be stabilized, a secondary member, and an anchor. The main member has a first tensile strength. The secondary member is attached to the main member, and has a second tensile strength lower than the first tensile strength. The anchor includes an anchor body attached to the secondary member and a moveable stop member attached to the main member, which is allowed to move relative to the anchor body such that in a first mode, force is applied to the anchor body through the secondary member, and in a second mode in which the secondary member has yielded, force is applied to the anchor body through the main member and the moveable stop member.

It is an object of the invention to provide seismic anchors, anchor systems, and structures that help to mitigate earthquake risks without greatly increasing the complexity, cost, and installation time of the anchor. It is also an object of the invention to provide a multi-mode seismic anchor with a safe failover mode providing According to a first aspect of the invention, a seismic anchor allows limited sliding of a structure atop a foundation in designated circumstances. The seismic anchor includes a main elongated member, a secondary elongated member, and an anchor. The main elongated member is for attachment to a structure to be stabilized, the main elongated member with a first tensile strength. The secondary elongated member is attached to the main elongated member, the secondary elongated member has a second tensile strength lower than the first tensile strength. The anchor is adapted to be embedded in a foundation of the structure to be stabilized and including an anchor body attached to the secondary elongated member and a moveable stop member attached to the main elongated member, the moveable stop member allowed to move relative to the anchor body such that in a first mode, force is applied to the anchor body through the secondary elongated member, and in a second mode in which the secondary elongated member has yielded, force is applied to the anchor body through the main elongated member and the moveable stop member.

In some embodiments of the first aspect, the anchor body includes a force-receiving surface against which the moveable stop member applies force in the second mode, the force-receiving surface, in the first mode, being separated from the moveable stop member by a volume defined by the anchor body. The first tensile strength and the second tensile strength may be selected to allow the structure being stabilized to slide on the foundation and allow energy to be dissipated through friction after the secondary elongated member yields. The anchor body may include an upper opening through which the main elongated member passes and is attached to the moveable stop member below the force-receiving surface. A compressible material such as a foam may be included, filling the volume in the first mode.

In some embodiments of the first aspect, the moveable stop member is a disc. In some embodiments of the first aspect, wherein the main elongated member is coated with a non-bonding material.

In some embodiments of the first aspect, the main elongated member is a steel strap, and the secondary elongated member is a steel strap with a smaller cross-sectional area than that of the main elongated member.

According to a second aspect of the invention, a structure includes a vertical wall, a concrete bed formed beneath the wall and extending beyond the wall, and a seismic anchor system for protecting the structure from potentially damaging ground movement and including a plurality of seismic anchors attached to the wall. Each seismic anchor includes a main elongated member, a secondary elongated member, and an anchor. The main elongated member is attached to the wall and has a first tensile strength. The secondary elongated member is attached to the main elongated member, but may instead be attached to the wall. The secondary elongated member has a second tensile strength lower than the first tensile strength. The anchor is embedded in the concrete bed and includes an anchor body attached to the secondary elongated member and a moveable stop member attached to the main elongated member. The moveable stop member is allowed to move relative to the anchor body such that in a first mode force is applied to the anchor body through the secondary elongated member, and in a second mode in which the secondary elongated member has yielded, force is applied to the anchor body through the main elongated member and the moveable stop member.

In some embodiments of the second aspect, the anchor body includes a force-receiving surface against which the moveable stop member applies force in the second mode, the force-receiving surface separated from the moveable stop member by a volume defined by the anchor body in the first mode. The first tensile strength and the second tensile strength may be selected to allow the structure to have a first designated amount of movement from seismic activity and an associated amount of energy to be dissipated through frictional sliding after the secondary elongated member yields. The anchor body may include an upper opening through which the main elongated member passes and is attached to the moveable stop member below the force-receiving surface. A compressible material such as foam may fill the volume in the first mode.

In some embodiments of the second aspect, the moveable stop member is a disc. In some embodiments of the second aspect, the main elongated member is coated with a non-bonding material.

In some embodiments of the second aspect, the main elongated member is a steel strap, and the secondary elongated member is a steel strap with a smaller cross-sectional area than that of the main elongated member.

According to a third aspect of the invention, a seismic anchor system is provided as set forth according to the second aspect. The seismic anchor system includes multiple anchors adapted for attaching to a structure at multiple points along a perimeter of the structure. The structure may be an above-ground tank, a building, or other applicable permanent above-ground structures or even temporary structures. The seismic anchor system may also be used with non-permanent structures such as cranes or other equipment.

BRIEF DESCRIPTION OF DRAWINGS

In the following description, the use of the same reference numerals in different drawings indicates similar or identical items.

DETAILED DESCRIPTION OF ILLUSTRATIVE EMBODIMENTS

Figure 1:
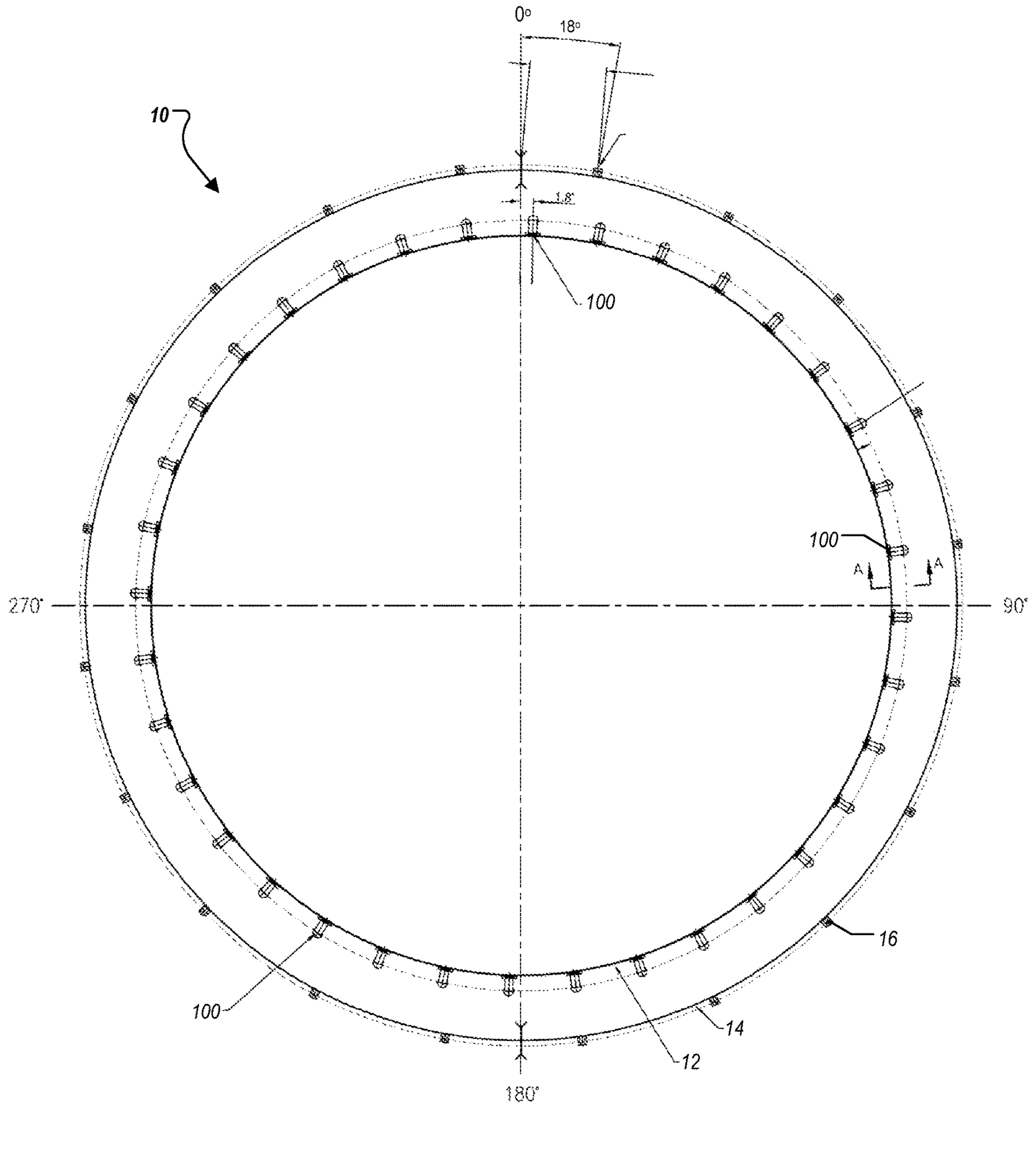
FIG. 1 shows an overhead plan view of a tank structure 10 including a seismic anchor system according to some embodiments.
Figure 2:
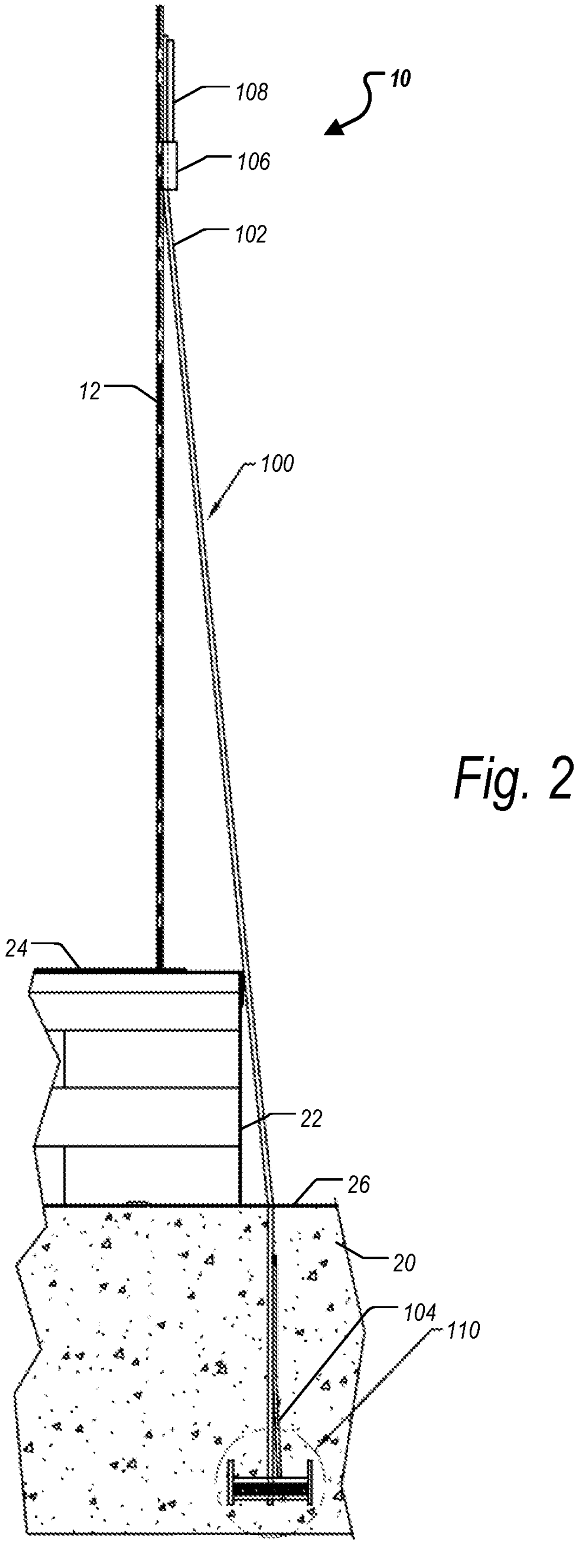
FIG. 2 shows a cross sectional view of a tank wall and seismic anchor system taken along the line A-A of FIG. 1.

FIG. 1 shows an overhead plan view of a tank structure 10 including a seismic anchor system according to some embodiments, while FIG. 2 shows a cross sectional view of a tank wall 12 and seismic anchor system taken along the line A-A of FIG. 1. Referring to FIG. 1 and FIG. 2, tank structure 10 is generally formed on a foundation pad or concrete bed 20. Tank structure 10 includes a vertical wall 12, typically circular, which forms the container sides of the tank and requires seismic stabilization. Concrete bed 20 is formed beneath the wall and generally extends beyond the wall. In this embodiment, an insulation blanket 22 constructed on concrete bed 20 to provide a level and stable support for the tank's base edge and to provide thermal insulation at the base of the tank. An inner tank annular ring 24 is present at the outer edge of the tank floor to provide additional strength where the tank floor meets vertical wall 12. The seismic anchor system is provided for protecting the structure from potentially damaging ground movement and includes a plurality of seismic anchors 100 attached to vertical wall 12. In this embodiment, thirty-five seismic anchors 100 are installed around depicted 360-degree perimeter of tank structure 10 at intervals of about ten degrees. An outer tank shell 14 is constructed around vertical wall 12 at an outer diameter typically several feet larger than the diameter of vertical wall 12, and anchored to concrete bed 20 with anchor bolts 16.

Each seismic anchor 100 includes a main elongated member 102 attached to vertical wall 12, a secondary elongated member 104 attached to main elongated member 102, and an anchor 110 embedded in concrete bed 20. By "elongated" it is meant that the members are longer than they are wide. In some embodiments, the first and second members are not elongated. In this embodiment, main elongated member 102 is secured to vertical wall 12 with a keeper plate 106 welded to vertical wall 12 and holding a spacer 108 against main elongated member 102. Secondary elongated member 104 is attached to main elongated member 102 and anchor 110, and in this embodiment is entirely embedded in concrete bed 20. While the secondary elongated member is attached to the primary elongated member in this embodiment, in other embodiments it may be attached to vertical wall 12, directly or indirectly. The structure and function of seismic anchor 100 is described in further detail with respect to FIGS. 3-5.

While anchors 110 are shown embedded in concrete bed 20 which forms the foundation of tank structure 10, in other embodiments anchors 110 may be anchored into other structures. For example, separate concrete beds may be used for each anchor, or a secondary foundation may be present along the periphery of the structures foundation into which anchors 110 are embedded.

Figure 3:
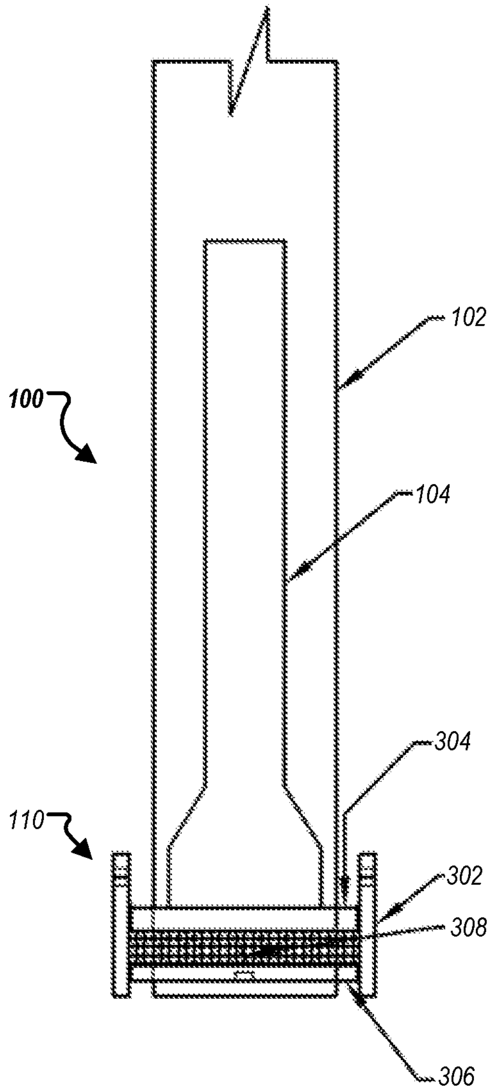
FIG. 3 shows a front cross-sectional view of a seismic anchor in relation to main elongated member and secondary elongated member.
Figure 4:
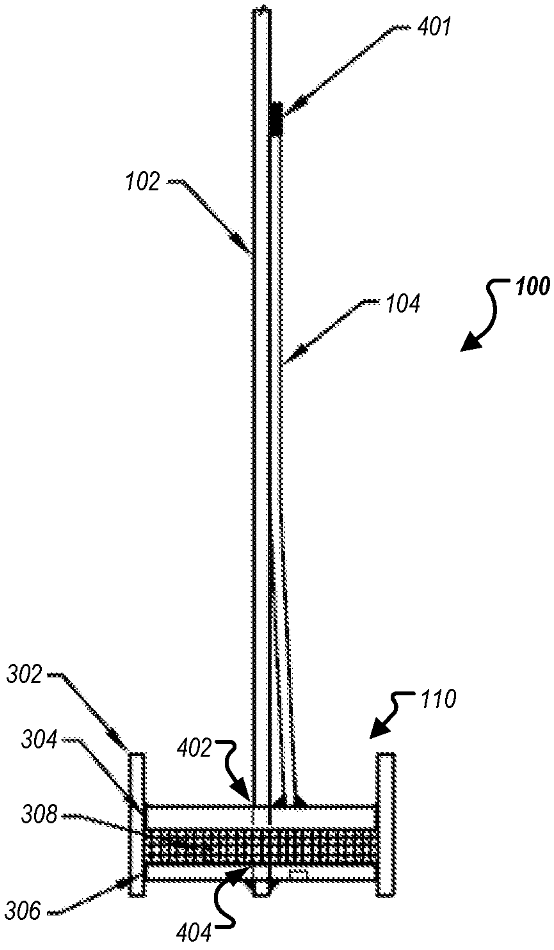
FIG. 4 shows a side cross-sectional view of the seismic anchor of FIG. 3.
Figure 5:
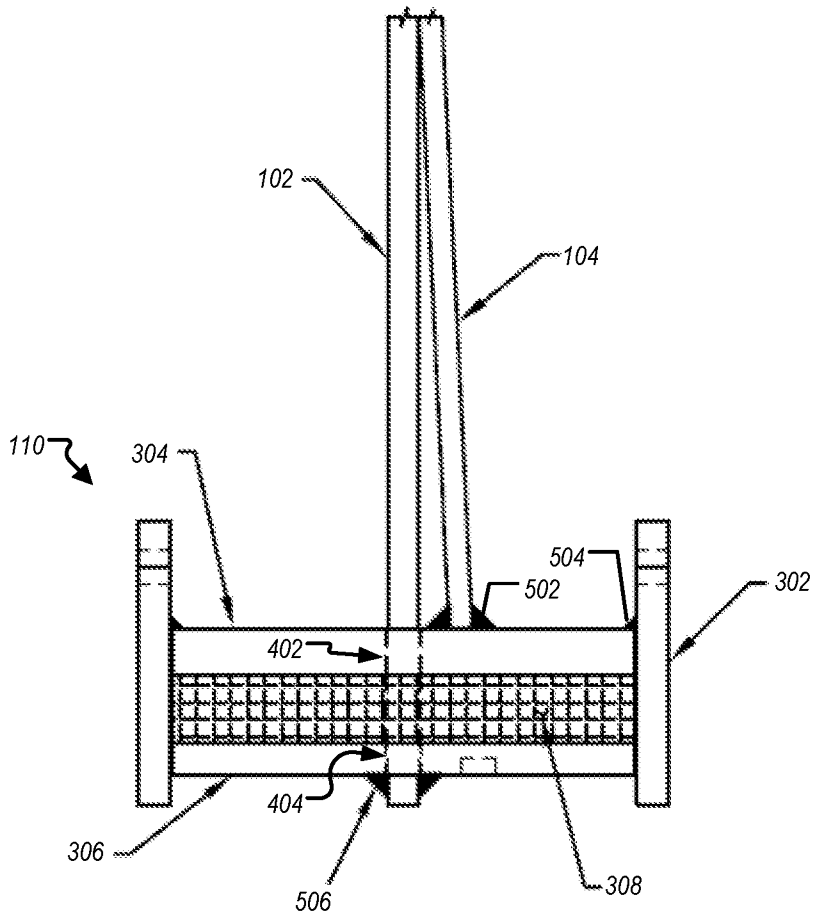
FIG. 5 shows an enlarged side cross-sectional view of the seismic anchor of FIG. 4.

FIG. 3 shows a front cross-sectional view of anchor 110 in relation to main elongated member 102 and secondary elongated member 104, while FIG. 4 shows the same anchor in a side cross-sectional view. FIG. 5 shows an enlarged cross-sectional view of the anchor of FIG. 4.

Referring to FIGS. 3-5, anchor 110 includes an anchor body 302 attached to secondary elongated member 104 with welds 502, and a moveable stop member 306 attached to main elongated member 102 with welds 506. In this embodiment, anchor body 302 is constructed of a short section of steel pipe, generally indicated at numeral 302, and a steel plate 304 welded inside the pipe section with welds 504. Steel plate 304 includes an opening 402 through which main elongated member 102 passes to attach to moveable stop member 306. Moveable stop member 306 also includes an opening 404 through which main elongated member 102 passes, and is welded at the lower side of moveable stop member 306 with a weld 502. A volume filled with a compressible material such as foam 308 is formed between moveable stop member 306, the pipe section indicated at 302, and the lower interior face of anchor body 302 formed by steel plate 304. Main elongated member 102 is coated with a non-bonding material such as Teflon to ensure it can move inside concrete bed 20 without significant resistance as secondary elongated member 104 yields. Secondary elongated member 104 may be similarly coated. As shown in FIG. 4, secondary elongated member 104 has a deformable cap 401 placed atop it, formed of Styrofoam or another suitable deformable material, to allow the top of secondary elongated member 104 to move within concrete bed 20 without significant resistance from the surrounding concrete. The height of deformable cap 401 is preferably the height of foam 308.

Figure 6:
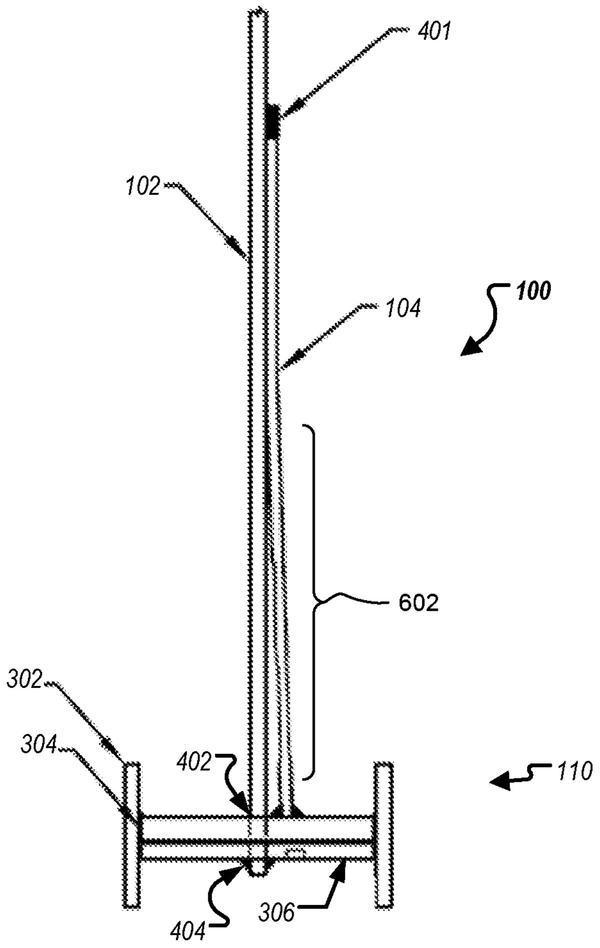
FIG. 6 shows a side cross-sectional view of a seismic anchor depicting a second operational mode following yielding of the secondary elongated member.

As further described below, in operation, moveable stop member 306 is allowed to move relative to anchor body 302 such that in a first mode force is applied to the anchor body through secondary elongated member 104, and in a second mode in which secondary elongated member 104 has yielded, force is applied to anchor body 302 through main elongated member 102 and moveable stop member 306. Generally, main elongated member 102 has a first tensile strength, and secondary elongated member 104 has a second tensile strength lower than the first tensile strength. The first tensile strength and the second tensile strength are selected to allow the structure being stabilized, an above-ground tank in this example, to move (slide) on the foundation and energy to be dissipated through the friction of such sliding after secondary elongated member 104 yields. The two modes of operation, corresponding to different positions of moveable stop member 306 relative to anchor body 302, in this version are designed for mitigating the effects of seismic movement such as shaking on the stability of a tank structure. This anchor system design provides a "safe failure" process, in which seismic activity past a predetermined threshold, which is expected to result in a certain amount of damage to the tank structure, causes secondary elongated member 104 to yield or deform. Such deformation is depicted in FIG. 6 by a deformed section 602, illustrating a portion of secondary elongated member which is stretched or further elongated due to seismic forces shifting or shaking the structure. This deformation allows a designated amount of movement of the structure as secondary elongated member 104 yields, which dissipates energy that might otherwise cause excessive damage. Then, moveable stop member 306 is pressed against the force receiving surface of anchor body 302, as depicted in FIG. 6. This movement causes a stronger anchor mode, the second mode, to be active and provide that force is transferred through main elongated member 102 to anchor body 302. The second mode provides a "failover" or backup anchor function which preserves overall structural integrity of the tank or other structure to be protected and help prevent catastrophic failures that might, for example, spill the liquid in the tank.

While in this version a steel pipe section and steel plates are used to construct anchor body 302, in other embodiments a similarly shaped structure may be constructed as a single piece of steel or other suitable material. In still other embodiments, another shape may be used to provide suitable structure for performing the same functions. For example, the depicted moveable stop member 306 is a steel plate in the shape of a disc, with a flat upper surface is movable to abut the flat lower surface of steel plate 304 to apply force to anchor body 302 in the second mode. However, a flat surface is not necessary and any suitable shape may be used, preferably with the force-receiving surface matching the shape of moveable stop member 306.

Main elongated member 102 and secondary elongated member 104 may be constructed of solid steel plates or straps, woven steel straps, steel cables, or similar structures of other suitable materials. Steel and various alloys of steel are the preferred materials because of their broad availability and well characterized strength and ductility. Preferably, to achieve the weaker tensile strength, secondary elongated member 104 has a smaller cross-sectional area than main elongated member 102 if the same materials are used for each. However, this is not limiting and other techniques may be employed to achieve the different tensile strengths in various embodiments. For example, different materials may be used in other embodiments, or different structural shapes may be used for the first and second elongated members.

In this embodiment, the depicted volume filled by foam 308 is present in the first operating mode, and is compressed as secondary elongated member 104 yields until moveable stop member 306 is pressed against the force receiving lower surface of steel plate 304. Generally, foam 308 does not serve a structural function and instead serves to fill the volume and prevent liquids or solids from entering the interior of anchor body 302 and causing corrosion or altering the anchor's function. For example, if sand, concrete, or water were to accidentally enter the interior volume at 308, the length of deformation before moveable stop member 306 is stopped would change and alter the function of anchor 110. If the volume were accidentally filled with an incompressible material, the anchor would not allow movement as designed. As such, in some embodiments, other types of compressible material may be used to fill the volume, and in some other embodiments, no material may be needed if the seismic anchor design and installation process ensures no leakage occurs into the interior volume. As can be understood, in the second mode, moveable stop member 306 may not directly contact the force receiving surface of anchor body 302 in the second mode because a small layer of compressed foam remains between them. However, force is still applied along this interface.

While in this embodiment, secondary elongated member 104 is attached to main elongated member 102 at its upper end, and is embedded in concrete bed 20, in other embodiments it may be attached to vertical wall 12, or attached to main elongated member 102 above the top surface of concrete bed 20.

In operation, the anchor system, deployed as depicted in FIG. 1, helps to protect and preserve a structure such as a tank during seismic events. In routine events, which are below a seismic level for which the structure is designed to be stable, the anchor system operates as a traditional seismic anchor in the first mode. During an event with larger seismic movement than the structure is designed to bear, secondary elongated member 104 ultimately yields and elongates, allowing engagement of the larger, stronger anchor formed by main elongated member 102 to provide an anchor condition referred to as Safe Shutdown Earthquake (SSE). This elongation acts to help the tank to have some freedom to dissipate energy by sliding along its foundation during such an event, helping to prevent the loss of tank contents. While preferably the change from first mode to second mode involves yielding and deformation of secondary elongated member 104, this is not limiting and the anchor still functions, for example, if secondary elongated member fails completely and breaks. However, yielding is preferred because it provides a smooth transition from the first mode to the second mode.

An important factor to note is that during traditional operations, the tank is designed not to slide or lift upward, which are both important factors for tank design. However, in an upset condition where the tank can become damaged and unsuitable for future service, the seismic anchor system herein can help ensure that the structure will have predictable, safe behavior even if it loses operational capability. The use of two elongated members provides a dual-mode anchor system in which each anchor behaves like two anchors which work together, both providing benefits as described, while the transition from one to the is achieved with a reduced or minimal shock impact.

An anchor system designed with a similar purpose, providing a failover mode that allows some movement, might be constructed with two totally separate anchors at each anchor location, a stronger anchor and a weaker anchor. The stronger anchors are provided with slack and both anchors operate separately, with the weaker anchors having no slack. When the weaker anchors yield, the stronger anchors are used. However, such a design takes up more space than the preferred anchor design described herein. The preferred design also provides that the anchor regions are very consistent and accurate. Furthermore, the preferred combined design herein dampens the transition from weaker operational anchor to stronger (SSE) anchoring requirements.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A seismic anchor for allowing limited sliding of a structure atop a foundation in designated circumstances, the seismic anchor comprising:

a main elongated member for attachment to a structure to be stabilized, the main elongated member having a first tensile strength;

a secondary elongated member attached to the main elongated member, the secondary elongated member having a second tensile strength lower than the first tensile strength; and an anchor adapted to be embedded in a foundation of the structure to be stabilized and including an anchor body attached to the secondary elongated member and a moveable stop member attached to the main elongated member, the moveable stop member allowed to move relative to the anchor body such that in a first mode, force is applied to the anchor body through the secondary elongated member, and in a second mode in which the secondary elongated member has yielded, force is applied to the anchor body through the main elongated member and the moveable stop member.

2. The seismic anchor of claim 1 wherein the anchor body includes a force-receiving surface against which the moveable stop member applies force in the second mode, the force-receiving surface, in the first mode, being separated from the moveable stop member by a volume defined by the anchor body.

3. The seismic anchor of claim 2 wherein the first tensile strength and the second tensile strength are selected to allow the structure being stabilized to slide on the foundation and allow energy to be dissipated through friction after the secondary elongated member yields.

4. The seismic anchor of claim 2 wherein the anchor body includes an upper opening through which the main elongated member passes and is attached to the moveable stop member below the force-receiving surface.

5. The seismic anchor of claim 2 further comprising a compressible material filling the volume in the first mode.

6. The seismic anchor of claim 5 wherein the compressible material is a foam.

7. The seismic anchor of claim 1 wherein the moveable stop member is a disc.

8. The seismic anchor of claim 1 wherein the main elongated member is coated with a non-bonding material.

9. The seismic anchor of claim 1 wherein the main elongated member is a steel strap, and the secondary elongated member is a steel strap with a smaller cross-sectional area than that of the main elongated member.

10. A structure comprising:

a vertical wall;

a concrete bed formed beneath the wall and extending beyond the wall; and a seismic anchor system for protecting the structure from potentially damaging ground movement and comprising a plurality of seismic anchors attached to the wall, each seismic anchor comprising:

a main elongated member attached to the wall, the main elongated member having a first tensile strength;

a secondary elongated member attached to the main elongated member, the secondary elongated member having a second tensile strength lower than the first tensile strength; and an anchor embedded in the concrete bed and including an anchor body attached to the secondary elongated member and a moveable stop member attached to the main elongated member, the moveable stop member allowed to move relative to the anchor body such that in a first mode force is applied to the anchor body through the secondary elongated member, and in a second mode in which the secondary elongated member has yielded, force is applied to the anchor body through the main elongated member and the moveable stop member.

11. The structure of claim 10 wherein the anchor body includes a force-receiving surface against which the moveable stop member applies force in the second mode, the force-receiving surface separated from the moveable stop member by a volume defined by the anchor body in the first mode.

12. The structure of claim 11 wherein the first tensile strength and the second tensile strength are selected to allow the structure to have a first designated amount of movement from seismic activity and an associated amount of energy to be dissipated through frictional sliding after the secondary elongated member yields.

13. The structure of claim 11 wherein the anchor body includes an upper opening through which the main elongated member passes and is attached to the moveable stop member below the force-receiving surface.

14. The structure of claim 11 further comprising a compressible material filling the volume in the first mode.

15. The structure of claim 14 wherein the compressible material is a foam.

16. The structure of claim 10 wherein the moveable stop member is a disc.

17. The structure of claim 10 wherein the main elongated member is coated with a non-bonding material.

18. The structure of claim 10 wherein the main elongated member is a steel strap, and the secondary elongated member is a steel strap with a smaller cross-sectional area than that of the main elongated member.

* * * * *